Dec. 23, 1969    C. L. REHM    3,485,712
TIRE REPAIR DEVICE
Filed Jan. 3, 1966

INVENTOR.
CARL L. REHM
BY
Jesse, Jesse & Sammon
ATTORNEYS

United States Patent Office 3,485,712
Patented Dec. 23, 1969

---

3,485,712
TIRE REPAIR DEVICE
Carl L. Rehm, Canton, Ohio, assignor to E-Z Manufacturing Company, Canton, Ohio, a corporation of Ohio
Filed Jan. 3, 1966, Ser. No. 518,322
Int. Cl. B32b 25/08
U.S. Cl. 161—240                                1 Claim

ABSTRACT OF THE DISCLOSURE

A composite tire repair device including a pair of laterally spaced outer layers of tacky uncured elastomeric material, an inner reinforcement layer of cured elastomeric material disposed between and bonded to the outer layers, the reinforcement layer including an elastomeric material reinforced with discrete, particulate fibrous material, and an outermost layer detachably secured to each of the outer layers to provide a protective cover therefor.

---

Figure 1:
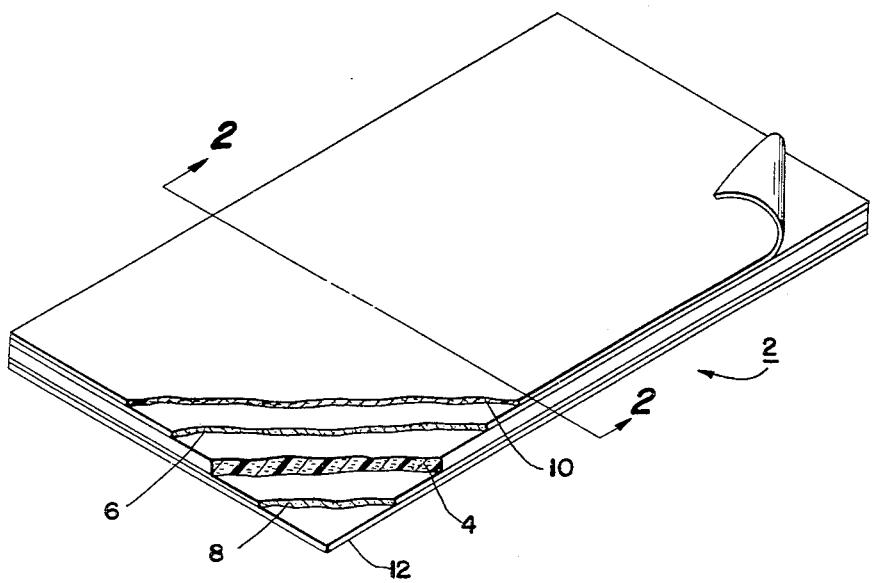

This invention relates to tire repair devices, and more particularly relates to an improved construction for a tire repair device adapted for sealing a puncture or the like in a vehicle tire, particularly of the inflatable tubeless type.

Heretofore, it has been known to repair punctures in the form of holes or tears in vehicle tires by the use of specially designed plugs, bundles of rubber string or by the use of laminated rubber inserts which are inserted into the puncture. In the latter case, the inserts have generally been made from a series of vulcanized and unvulcanized rubber strips which have been joined together in various arrangements to provide an insert which is normally folded over upon itself for insertion into the puncture. Such heretofore known arrangements, have not been satisfactory in providing the neccessary strength and flexibility characteristics required to withstand the complex stress, strain and shrinkage forces which are imparted to the puncture during normal usage of the tire. Consequently, such heretofore known tire repair devices have the tendency to pop-out or break during insertion into the tire and/or during usage of the tire, thereby allowing the leakage of pneumatic pressure from the tire. Moreover, it was often necessary to incorporate extensive amounts of sulfur and accelerator in the uncured outer layers.

Accordingly, it is a principal object of the present invention to provide an improved construction for a tire repair device and method of making the same which effectively overcomes the aforementioned and other related disadvantages of heretofore known types of tire repair devices.

Another object of the present invention is to provide a composite, multiple-layer, laminate-like tire repair device which has improved strength and flexibility characteristics so as to provide a tight seal in the puncture of a vehicles tire.

Another object of the invention is to provide a multiple-layer, laminate-like tire repair device wherein the base member, while being thin and flexible, is still strong enough to permit the use of outer layers having a tacky character thereby to provide an improved repair having improved wear-life.

A further object of the present invention is to provide a tire repair device of the character described which incorporates a novel structure and composition which is generally commensurate with the structure and composition of the material removed by the puncture to provide an integral, homogeneous seal with the tire, thereby to effectively prevent the leakage of pneumatic pressure from the interior of the tire.

A still further object of the present invention is to provide a tire repair device of the character described which is inexpensive to produce, which is quickly and easily installed, and not torn during the installation, and which is readily adapted to fill the entire area of the puncture irrespective of the size and/or unevenness of the puncture.

Figure 2:
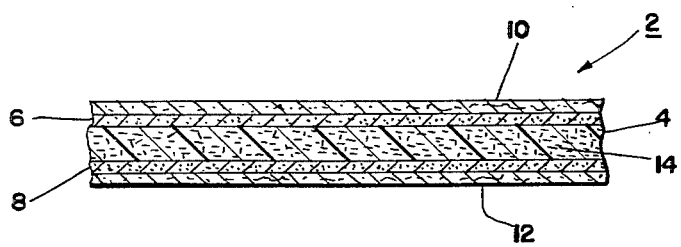

Other objects and advantages of the invention will be apparent from the following description taken in conjunction with the accompanying drawings, wherein:

FIG. 1 is a generally perspective view, partly in section, showing the tire repair device made in accordance with the present invention with one of its protective covers being turned up for removal thereof; and FIG. 2 is an enlarged cross-sectional view taken along the plane indicated by the line 2—2 of FIG. 1.

In FIGS. 1 and 2, there is illustrated, in one form of the invention, a tire repair device, designated generally at 2, in the form of a composite, multiple-layer, laminate-like structure which is adapted for insertion into a puncture for coacting sealing engagement therein to prevent the leakage of pneumatic pressure from a vehicle tire. The term, "tire" as applied herein refers to the outer conventional casing of a pneumatic tire. The term, therefore, would not refer to the inner tube of a pneumatic tire, but to the surrounding casing therefor. The present invention deals, however, principally with the repair of a tubeless tire, i.e. those wherein the outer casing only is employed.

The device 2, in the embodiment shown, in its simpliest form, preferably comprises five layers of material which are joined together to provide the composite structure shown. Preferably, the device 2 comprises an inner, cured base layer 4 which provides a reinforcement for a pair of outer, tacky uncured layers 6 and 8 which are connected to and disposed on either side of the base layer 4. The respective outer, uncured layers 6 and 8 are each preferably covered with a thin layer 10 and 12 of protective material, such as Holland cloth or the like, which remains adhesively in place thereon to protect the outer, tacky uncured surfaces prior to installation and actual use thereof.

In accordance with the present invention, the inner, cured base layer 4 is preferably comprised of an elastomeric material, such as a suitable rubber composition. As best shown in FIG. 2, the base layer 4 is preferably impregnated with a fibrous material, as at 14, which acts as a reinforcement therefor. The fibrous material, 14, may be of any suitable natural or synthetic material, such as nylon or the like, which possesses high strength and flexibility characteristics commensurate with the strength and flexibility characteristics of the fiber cords of the vehicle tire. The fibrous material 14 is preferably given a more or less random, particulate orientation so as to uniformly fill the entire area of the base layer 4. This arrangement provides optimum strength in the layer, and particularly high tensile strength to withstand the tractive forces during insertion of the device into a puncture to maintain a tight sealing engagement of the outer, uncured layers 6 and 8 during subsequent usage of the tire. Furthermore, such an arrangement maintains a sufficient flexibility in the base layer 4 so that the device may yieldably expand and contract when installed within the puncture caused by the flexing action during use of the tire. Thus, it will be seen that the cured and impregnated base layer 4 provides a reinforcement and support which incorporates generally the same physical properties as are present in the tire, i.e. the tire cords, so that upon insertion of the device into the puncture the device becomes an integral part thereof to provide homogeneous seal which exhibits substantially the same physical characteristics as the material removed by the puncture.

The outer, uncured layers 6 and 8 are preferably comprised of an elastomeric material, such as of a rubber composition. It is preferred that the outer layers 6 and 8 be substantially or completely free of sulfur and accelerator. The layers 6 and 8 are preferably of a soft and flexible characteristic so as to readily assume the contour of the puncture and to provide a tacky surface thereby to provide a tight sealing engagement with the confronting interior wall surfaces thereof.

The device 2, in the embodiment shown, may vary in size so as to easily, but completely fill the tire puncture. The insert should at least be larger than the size of the puncture. One desirable overall thickness of the device is about .10 inch. In such case, the inner, cured base layer 4 has a thickness of about .05 inch with the outer, uncured layers 6 and 8 each having a thickness of about .15 inch and with the outer protective layers each having a thickness of about .01 inch.

Inasmuch as the most common tire punctures are produced in the form of elongated tears or cracks having irregular and uneven shapes, it is desirable that the device 2 have a polygonal, such as rectangular, shape in cross-section so that the material of the respective layers completely fills the puncture, particularly the small fissure crazes which result both in the rubber and the fabric cord of the tire.

The inner base layer 4 may be conveniently prepared by mixing the fibrous material together with sulfur and accelerator uniformly throughout a rubber composition in a conventional batching apparatus, such as a mixer or the like, with the fibrous material uniformly impregnated throughout the rubber composition of the base layer.

Sequentially considering the operation, a first sheet 12 of protective material, i.e. Holland cloth, may be fed from a supply roll into a conventional type calender apparatus. Uncured rubber material may then be calendered onto the first sheet 12 of protective material to form the layer 8. The fiber-impregnated rubber material may then be calendered onto the first layer 8 of uncured rubber material to form the layer of impregnated material 4. Uncured rubber material may then be calendered onto the layer 4 of impregnated rubber material to form the layer 6, whereupon, the second sheet 10 of protective material may then be calendered onto the layer 6 of uncured rubber. The calendered layers thus assembled may then be fed through a suitable heated press or the like wherein sufficient pressure and temperature may be applied to the layers to cure the impregnated layer 4 and join all of the layers together to provide the composite structure shown. It has been found, that this is an inexpensive and efficient procedure for making the tire repair device.

In application of the device, the protective covering layers 10 and 12 are simply removed so as to expose the tacky surfaces of the outer, uncured layers 6 and 8. Thereupon, the device may then be inserted into the puncture by means of a suitable applicator, such as an open-eye tool, as known in the art. Prior to insertion, the repair device may be folded transversely so that it may be easily inserted into the puncture, yet to provide the necessary cross-sectional dimension to provide a tight seal therein. If desired, the puncture may be thoroughly cleaned prior to the insertion of the device and an adhesive, such as a rubber-base cement, may be applied to the device and/or to the interior of the puncture to provide an additional securement of the device therein. It is believed that where the outer uncured layers 6 and 8 are substantially free of sulfur and accelerator, such repair is superior to repairs having such curing agents therein. The present arrangement remains tacky and uncured thereby enhancing the adhesive character of the bond between confronting opposed surfaces of the repair device and the puncture hole with the repair being strong enough, though tacky, to provide a strong seal; while being flexible enough to conform to the shape of the puncture opening. It is believed that devices having a curable outer layer often cause the repair to become cured independently of the tire, or when cured to the tire, the bond is very weak. Such repairs have then neither the advantage of a strong and lasting cure to the tire, nor of a prolonged tacky surface aiding adhesive. It is understood that substantial sulfur and accelerator may be added to the outer uncured layers. However, then the aforesaid additional advantage of a prolonged tacky interface is not achieved.

From the foregoing description and accompanying drawings, it will be seen that the present invention provides a novel, composite, multiple-layer, laminate-like tire repair device for insertion in sealing engagement with a puncture and which incorporates improved strength and flexibility characteristics sufficient to withstand the complex stress, strain and shrinkage forces exerted upon the puncture during normal usage of the tire. The device incorporates a novel structural arrangement so as to provide a seal which completely fills the cross-sectional area of the puncture irrespective of any unevenness therein, particularly with respect to small fissure crazes. More importantly, the tire repair device of the invention incorporates a novel structural arrangement which is physically and chemically commensurate in physical properties with the material of the tire, thereby to provide an integral homogeneous seal with the tire which will not loosen and/or break so as to prevent the leakage of pneumatic pressure from the interior of the tire.

The terms and expression which have been used herein are terms of description and not of limitation, and there is no intention in the use of such terms and expressions of excluding any equivalents of any of the features shown or described, or portions thereof, but it is recognized that various modifications are possible within the scope of the invention claimed.

I claim:

1. An elongated, composite laminated tire repair device having improved strength and flexibility characteristics for insertion in a slit-like puncture or the like in a tire carcass and having physical property characteristics substantially commensurate with the material removed from said puncture comprising, a multiple-layer structure including a pair of oppositely disposed, laterally spaced outer layers made of a tacky uncured rubber material being substantially free of curing agents, an elongation-resisting inner base-like reinforcement layer of cured rubber material disposed between and bonded to said outer layers and providing a reinforced support therefor, said inner base-like layer being at least as thick as said outer layers, said reinforcement layer including cured rubber reinforced with discrete, particulate fibrous material, with said material being randomly oriented and substantially uniformly distributed throughout said cured rubber to give increased tensile strength to said layers to resist tearing and elongation by tractive force during insertion into said puncture and stress, strain and shrinkage forces during normal usage of a tire when in the installed position of said device, and an outermost layer detachably secured to each of said outer layers in the form of a tear strip to provide a protective cover for said device.

References Cited

UNITED STATES PATENTS

| | | | |
|---|---|---|---|
| 2,937,684 | 5/1960 | Rockoff | 152—362 |
| 3,035,626 | 5/1962 | Mullen | 156—97 X |
| 3,049,164 | 8/1962 | Humphrey et al. | 156—97 |
| 3,088,512 | 5/1963 | Buckland | 152—370 |
| 3,095,342 | 6/1963 | Kraly | 156—97 |
| 3,149,658 | 9/1964 | Wolfe | 156—95 |
| 3,254,694 | 6/1966 | Sparks et al. | 152—362 |
| 3,272,253 | 9/1966 | Brose | 152—370 |

HAROLD ANSHER, Primary Examiner

C. B. COSBY, Assistant Examiner

U.S. Cl. X.R.

152—370; 156—97